US010284269B2

(12) United States Patent
Janis et al.

(10) Patent No.: US 10,284,269 B2
(45) Date of Patent: May 7, 2019

(54) SOFT CODEBOOK SUBSET RESTRICTION FOR ELEVATION BEAMFORMING

(71) Applicant: Nvidia Corporation, Santa Clara, CA (US)

(72) Inventors: Pekka Janis, Helsinki (FI); Tommi Koivisto, Helsinki (FI); Kari Hamalainen, Helsinki (FI)

(73) Assignee: Nvidia Corporation, Santa Clara, CA (US)

( * ) Notice: Subject to any disclaimer, the term of this patent is extended or adjusted under 35 U.S.C. 154(b) by 195 days.

(21) Appl. No.: 15/005,650

(22) Filed: Jan. 25, 2016

(65) Prior Publication Data
US 2016/0218783 A1    Jul. 28, 2016

Related U.S. Application Data

(60) Provisional application No. 62/108,242, filed on Jan. 27, 2015.

(51) Int. Cl.
*H04B 7/0456*   (2017.01)
*H04W 16/28*   (2009.01)
*H04B 7/06*   (2006.01)

(52) U.S. Cl.
CPC .......... *H04B 7/0469* (2013.01); *H04B 7/0478* (2013.01); *H04B 7/065* (2013.01); *H04B 7/0639* (2013.01); *H04W 16/28* (2013.01)

(58) Field of Classification Search
CPC .................................................. H04B 7/0469
USPC .......................................................... 375/267
See application file for complete search history.

(56) References Cited

U.S. PATENT DOCUMENTS

| 8,238,225 | B2 * | 8/2012 | Wennstrom | H04B 7/0452 370/203 |
|---|---|---|---|---|
| 8,767,661 | B2 * | 7/2014 | Han | 370/329 |
| 2014/0355702 | A1 * | 12/2014 | Thomas | H04L 5/0032 375/267 |

* cited by examiner

*Primary Examiner* — Lihong Yu

(57) ABSTRACT

A communications system has a cellular structure including a base station that is located within a cell of the cellular structure and provides an elevation beamforming transmission based on a set of elevation precoding matrix indicator offsets in an elevation codebook. The communications system also includes user equipment that is located within the cell and coupled to the base station to receive the set of elevation precoding matrix indicator offsets and a set of reference signals to provide channel quality and inter-cell interference measurements, wherein a selected channel quality indicator is based on an increase in channel quality with respect to inter-cell interference at the user equipment and corresponds to one of the set of elevation precoding matrix indicator offsets. A method of operating a communications system having a cellular structure is also provided.

27 Claims, 2 Drawing Sheets

SOFT CODEBOOK SUBSET RESTRICTION FOR ELEVATION BEAMFORMING

CROSS-REFERENCE TO RELATED APPLICATION

This application claims the benefit of U.S. Provisional Application Ser. No. 62/108,242, filed by Pekka Janis, et. al. on Jan. 27, 2015, entitled "Soft Codebook Subset Restriction For Elevation Beamforming," commonly assigned with this application and incorporated herein by reference.

TECHNICAL FIELD

This application is directed, in general, to electronic communications and, more specifically, to a communications system and a method of operating a communications system.

BACKGROUND

Currently, the base-stations (eNB) of a Long Term Evolution (LTE) network apply user equipment specific beamforming typically in the azimuth or polarization domain. At the same time, the current antenna arrays equipped at base stations consist of multiple antenna elements which are also distributed vertically into antenna columns. Recently the possibility of applying dynamic, user equipment specific beamforming using different antenna elements of each antenna column has been taken under consideration, in order to boost LTE system performance. What is needed in the art is an improved way to accomplish elevation beamforming to address Elevation Beamforming/Full-Dimension MIMO (EB/FD-MIMO) in LTE.

SUMMARY

Embodiments of the present disclosure provide a communications system having a cellular structure and a method of operating a communications system having a cellular structure.

In one embodiment, the communications system has a cellular structure and includes a base station that is located within a cell of the cellular structure and provides an elevation beamforming transmission based on a set of elevation precoding matrix indicator offsets in an elevation codebook. The communications system also includes user equipment that is located within the cell and coupled to the base station to receive the set of elevation precoding matrix indicator offsets and a set of reference signals to provide channel quality and inter-cell interference measurements, wherein a selected channel quality indicator is based on an increase in channel quality with respect to inter-cell interference at the user equipment and corresponds to one of the set of elevation precoding matrix indicator offsets.

In another aspect, the method includes selecting a set of elevation precoding matrix indicator offsets in an elevation codebook for elevation beamforming based on reducing inter-cell interference by a base station located within a cell of the cellular structure and transmitting the set of elevation precoding matrix indicator offsets and a set of reference signals for channel quality and inter-cell interference measurements from the base station to user equipment within the cell. The method also includes selecting a channel quality indicator and a corresponding one of the set of elevation precoding matrix indicator offsets based on the channel quality and inter-cell interference measurements by the user equipment and reporting the selected channel quality indicator and elevation precoding matrix indicator offset by the user equipment to the base station. The method further includes transmitting data using an elevation beamforming based on the selected elevation precoding matrix indicator offset at a data rate based on the selected channel quality indicator from the base station to the user equipment.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Figure 1:
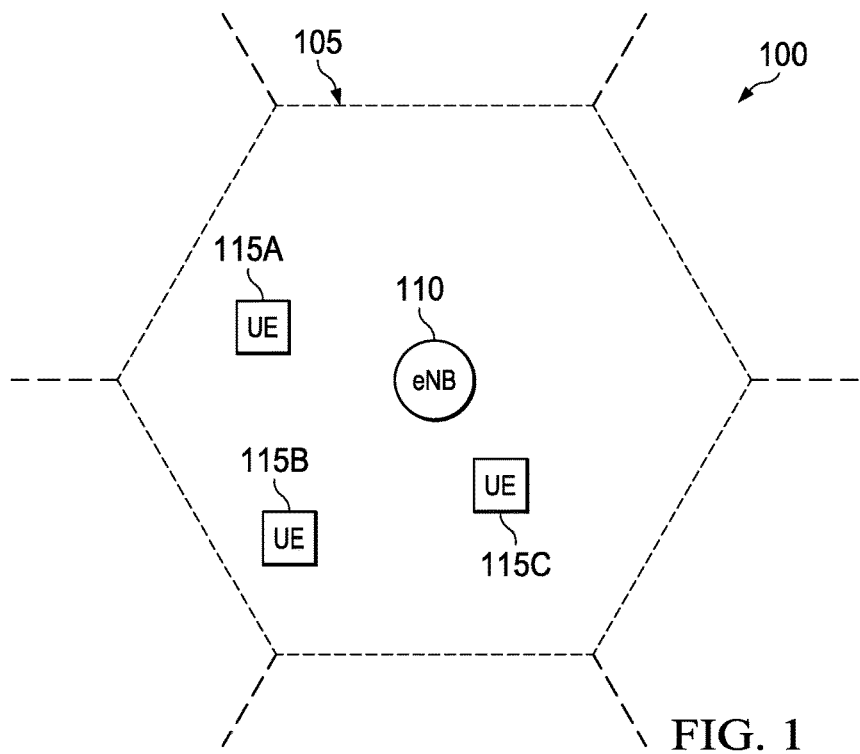
FIG. 1 illustrates a diagram of a communications system constructed according to the principles of the present disclosure.

Cell-specific elevation beamforming corresponds to choosing a down-tilt for a base station antenna array. Consider a population of user equipment located on ground level being served by a base station whose antenna array is mounted to a mast or a roof-top. In this rather common case, it well known that the transmit beam of the base station should be down-tilted, such that the array gain is maximized for user equipment closer to the base station, while the energy radiated to or received from neighboring cell user equipment is minimized. Good down-tilt values applied jointly over the base stations maximize the signal to inter-cell interference ratio for the user equipment across communication cells.

In general, an optimal down-tilt strategy from a single base station perspective does not simply maximize the received signal level at the served user equipment but would also avoid excessive inter-cell interference for neighboring cells. Therefore, in practice, optimization of cell-specific down-tilts is part of network planning and deployment optimization tasks of network operators.

A single cell-specific down-tilt that is optimized for a user equipment distribution is not optimal from a single user equipment's perspective, however. At any given time and frequency (e.g., an LTE physical resource block (PRB)) a base station is transmitting data to a specific user equipment. When an applied down-tilt or a transmit beamformer on a physical resource block is optimized for each user equipment instead of a whole user equipment distribution, system performance improvement may be obtained. However, a user equipment-specific elevation beamformer needs to selected such that the interference radiated toward neighboring cells is taken into account.

In time division duplex (TDD) systems where the uplink and downlink channels are reciprocal, an elevation beamformer may be selected according to channel measurements on uplink transmissions. Such measurements may be done on the sounding reference signals (SRS) transmitted by the user equipment. However, in frequency division duplex (FDD) systems such reciprocity may not be assumed in general. Therefore, in FDD systems user equipment needs to measure the channel from downlink reference signals (RS), and then subsequently report the channel measurement back to the base station. In an LTE environment, this spatial channel state information (CSI) feedback is based on a codebook, and the user equipment feedback contains a precoding matrix index (PMI) to the codebook. In particular, it may be assumed that the user equipment selects a PMI that maximizes the expected throughput of a hypothetical data transmission to itself.

However, the user equipment does not have any way of predicting the possible implications that usage of a given precoder may have on the neighboring cell user equipment, and hence on the communications system performance as a whole. User equipment that is located on a line of sight between a serving base station and user equipment in a neighboring cell is likely to report a PMI that causes maximal interference to that neighboring cell user equipment, which may result in suboptimal overall system performance. In order to avoid this problem, embodiments of the present disclosure provide an elevation precoding codebook is that is designed such that the inter-cell interference is at a tolerable level for all PMIs. In one example, this may be accomplished by not including precoders in the codebook that would point to the horizon.

In general, practical base station deployments employ network layouts that are not homogeneous, in that cell sizes and base station antenna mounting heights are not equal, and the geographical distribution of served user equipment is not homogeneous and known a-priori across the cells. Hence, it is difficult to design and specify a codebook that results in good performance for an arbitrary network deployment.

Embodiments of the present disclosure are advantageous over typical PMI selection approaches in that performance is optimized not only considering the performance of the user equipment itself, but also by penalizing PMI selections leading to degraded overall system performance. Thus, the system performance (instead of a single UE performance) is increased or optimized. Additionally, they are advantageous in that they are applicable to practical scenarios where the network layout and geographical distribution of UEs is not strictly homogeneous. They also provide configurable system solutions that are adaptable, for example, to existing traffic patterns.

Figure 2:
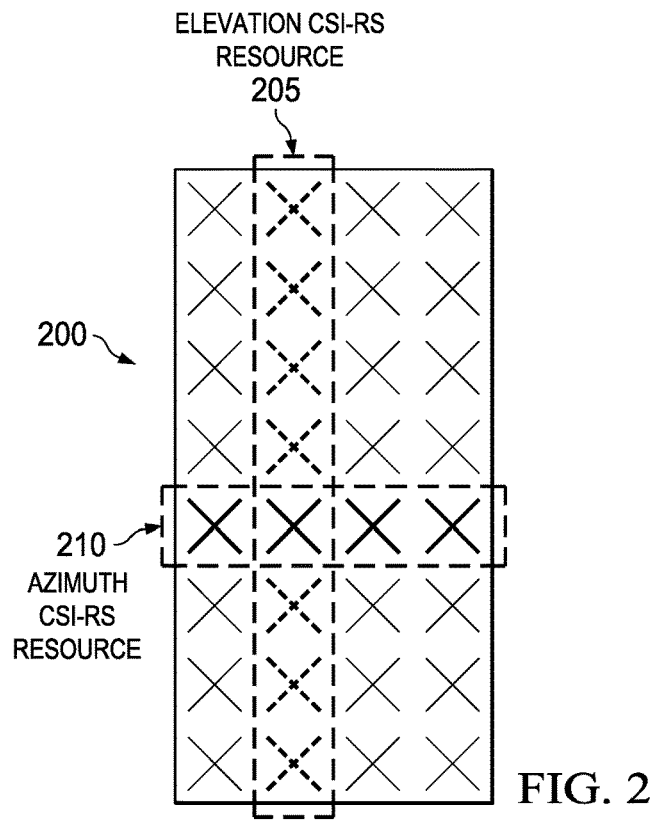
FIG. 2 illustrates column and row antenna representations for elevation and azimuth CSI-RS resources that may be employed in the communications system of FIG. 1.

FIG. 1 illustrates a diagram of a communications system, generally designated 100, constructed according to the principles of the present disclosure. The communications system 100 includes a communications cell 105 having a base station 110 and a population of user equipment 115A-115C. Here the base station 110 employs an antenna structure for communicating with the user equipment 115A-115C that has columns and rows as depicted in FIG. 2, which is generally used to provide elevation and azimuth beamforming for the user equipment 115A-115C.

The communications system 100 may be seen to have a cellular structure and the user equipment 115A-115C are located within the cell 105 to receive an elevation beamforming transmission. Accordingly, the base station 110 within the cell 105 provides an elevation beamforming transmission based on a set of elevation precoding matrix indicator offsets in an elevation codebook. The user equipment 115A-115C located within the cell 105 are coupled to the base station 110 to receive the set of elevation precoding matrix indicator (PMI) offsets and a set of reference signals to provide channel quality and inter-cell interference measurements, wherein a selected channel quality indicator is based on an increase in channel quality with respect to inter-cell interference at a selected one of the user equipment 115A-115C and corresponds to one of the set of elevation precoding matrix indicator offsets.

Additionally, each of the user equipment 115A-115C has different elevations from the base station 110 and employs different azimuths with respect to the base station 110. Each of the user equipment 115A-115C is coupled to the base station to receive a channel state information process configuration to derive a biased channel quality indication.

The user equipment 115A-115C typically select a precoding matrix indicator (PMI), a channel quality indicator (CQI) and a rank indicator (RI) based on channel quality and inter-cell interference measurements performed on either cell-specific reference signals (CRS), channel state information reference signals (CSI-RS) or possibly, channel state information interference measurement (CSI-IM) resources.

Based on these channel and interference estimates, the user equipment 115A-115C select the PMI, CQI and RI that optimize certain criterion, for example, maximizes data throughput. Correspondingly, one exemplary method of choosing PMI, CQI and RI values is to calculate the CQI, which is proportional to a signal to interference and noise ratio (SINR) at a receiver output conditioned on each PMI and RI hypothesis, and select the PMI and RI that result in a highest CQI.

According to the principles of the present disclosure, each CQI is biased differently depending on the PMI index, resulting in biased PMI selection. Thus, PMIs resulting in higher inter-cell interference are selected only if they result in CQI values that are, by an offset, higher than others.

Based on the principles of the present disclosure, the base station 110 configures a bias to a user equipment elevation PMI selection. The bias is selected such that the desired signal to inter-cell interference power is increased, thereby avoiding such PMI selections that result in increased inter-cell interference.

According to the LTE specification, the ratios of the physical downlink shared channel (PDSCH) energy per resource element (EPRE) to the reference signal (e.g., cell-specific reference signals (CRS) or CSI-RS) EPRE that is assumed for the CQI derivation may be configured by the base station 110. This may be done via the RRC parameter nomPDSCH-RS-EPRE-Offset (for CRS channel measurements) or a representative parameter (e.g., the p-C parameter for CSI-RS channel measurements). These parameters are basically used to bias the CQI reporting.

PMI offsets may be regarded as common offsets for all the PMI values within the elevation codebook. In some cases, an additional PMI offset may be applied for each possible PMI separately in order to enable biasing of the resulting CQI in a PMI-dependent manner (i.e., a beamforming direction-dependent manner).

The PMI offset may be one of N possible values, and it may be signaled using $\log_2(N)$ bits where N may be one of 2, 4, or 8 for each PMI. The elevation codebook may contain K distinct rank-1 precoders, and the elevation codebook may contain discrete Fourier Transform (DFT) precoders where K is 16.

The elevation codebook may be a double codebook, where each precoding matrix is parameterized by two indexes. One of the indexes may further be signaled as a wideband index, which causes wideband beamforming of the transmitted signal, and the wideband index may be one of K values.

The elevation codebook may contain precoding matrices with columns of the form $w=[w_1, w_2, \ldots, w_M]^T$, where M is the number of transmit antenna ports and the phase difference of weights corresponding to two specific antenna ports p and q takes K different values (i.e., $\arg(w_p)-\arg(w_q) \in \{\varphi_1, \varphi_2, \ldots, \varphi_K\}$).

The PMI offsets may be signaled as a length $K*\log_2(N)$ vector of bits b, where each set of $\log_2(N)$ bits corresponds to an offset value, and the location of the set of $\log_2(N)$ bits within bit vector b corresponds to a PMI or a set of PMIs. Alternately, the location of the set of $\log_2(N)$ bits may correspond to a phase difference value $\varphi_k$.

Signaling of the PMI selection biasing configuration may be performed differently, as basically any function of a PMI index i to power offset $\delta=\delta(i)$ may be used. Nevertheless, the signaled biasing may be interpreted to describe an offset value per PMI or per phase difference value.

The elevation PMI offsets may be assumed only when selecting the elevation PMI, while the CQI derivation is not impacted by the elevation PMI offsets. Alternately, the elevation PMI offsets may be assumed for PMI, RI, and CQI derivation. The PMI offset may be further applied as a power offset in a PDSCH transmission, where PDSCH precoding is applied according to a reported elevation PMI.

Figure 3:
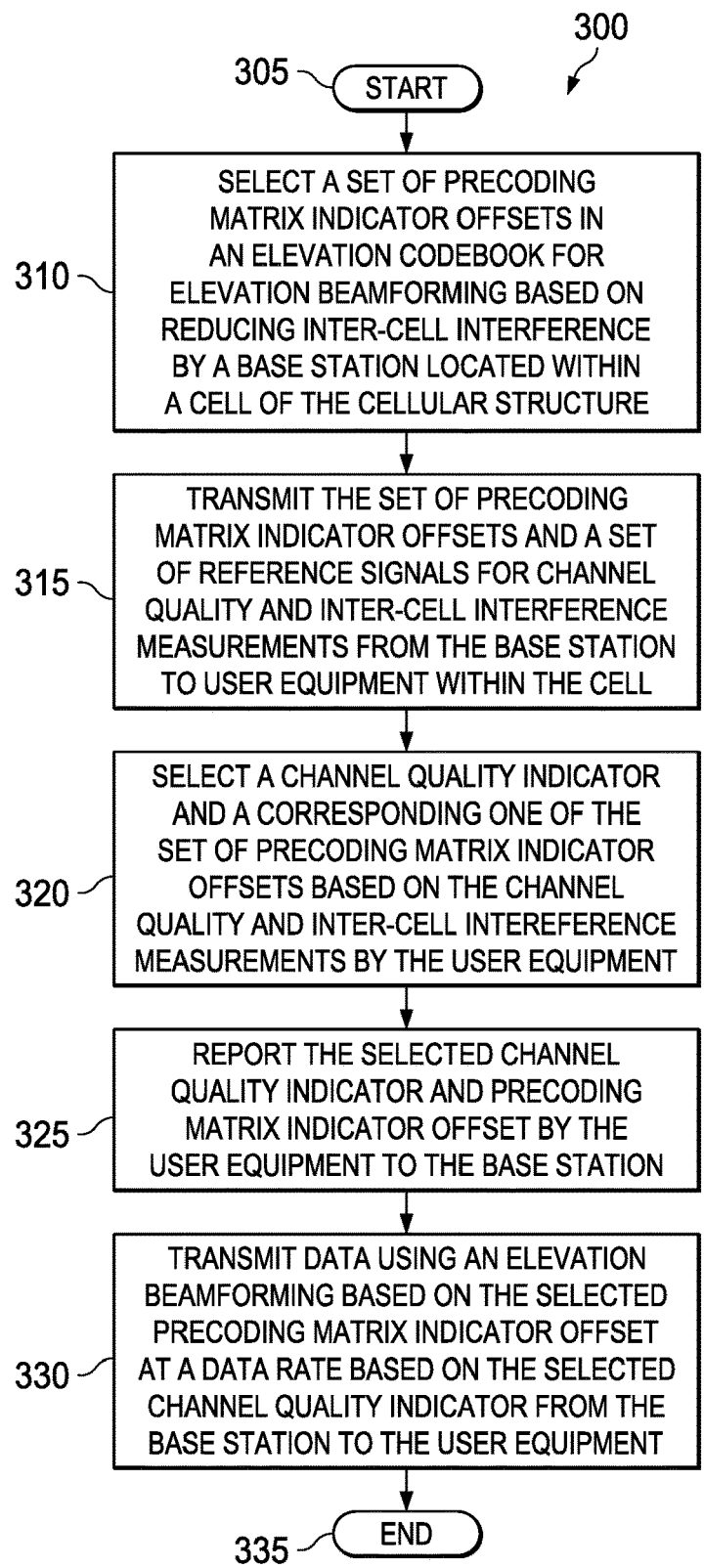
FIG. 3 illustrates a flow diagram of an embodiment of a method of operating a communications system carried out according to the principles of the present disclosure.

FIG. 3 illustrates a flow diagram of an embodiment of a method of operating a communications system having a cellular structure, generally designated 300, carried out according to the principles of the present disclosure. The method 300 starts in a step 305, and in a step 310, a set of elevation precoding matrix indicator (PMI) offsets in an elevation codebook for elevation beamforming based on reducing inter-cell interference is selected by a base station located within a cell of the cellular structure. Then, in a step 315, the set of elevation precoding matrix indicator (PMI) offsets and a set of reference signals for channel quality and inter-cell interference measurements is transmitted from the base station to user equipment within the cell. A channel quality indicator (CQI) and a corresponding one of the set of elevation precoding matrix indicator (PMI) offsets based on the channel quality and inter-cell interference measurements are selected by the user equipment, in a step 320.

The selected channel quality indicator (CQI) and elevation precoding matrix indicator (PMI) offset are reported by the user equipment to the base station, in a step 325. Data using an elevation beamforming based on the selected elevation precoding matrix indicator (PMI) offset at a data rate based on the selected channel quality indicator (CQI) are transmitted from the base station to the user equipment, in a step 330

In one embodiment, the selected channel quality indicator (CQI) is based on a ratio of a PDSCH energy per resource element (EPRE) and a reference signal including cell-specific reference signals (CRS) or a channel state information reference signal (CSI-RS) EPRE. Correspondingly, the reference signal is based on an RRC parameter nomPDSCH-RS-EPRE-Offset (for cell-specific reference signal (CRS) channel measurements) or a parameter representing (e.g., p-C for channel state information reference signal (CSI-RS) channel measurements).

In another embodiment, the precoding matrix indicator (PMI) offset corresponds to a common offset applied to all PMI values in the elevation codebook. In still another embodiment, the precoding matrix indicator offset corresponds to a precoding matrix indicator offset separately applied to each precoding matrix indicator in order to enable biasing of a resulting CQI in a direction-dependent beamforming manner.

In a further embodiment, the precoding matrix indicator (PMI) offset is one of N possible values and can be signaled using $\log_2(N)$ bits. In a yet further embodiment, the elevation codebook contains K distinct rank-1 precoders that include discrete Fourier transform (DFT) precoders having a K equal to 16. In a still further embodiment, the elevation codebook contains precoding matrices with columns of the form $w=[w_1, w_2, \ldots, w_M]^T$, where M is the number of transmit antenna ports and a phase difference of weights corresponding to two specific antenna ports p and q employs K different phase values (e.g., $\arg(w_p)-\arg(w_q) \in \{\varphi_1, \varphi_2, \ldots, \varphi_K\}$).

In a yet further embodiment, the PMI offset is signaled as a length $K*\log_2(N)$ vector of bits b, where each set of $\log_2(N)$ bits corresponds to a PMI offset value and the location of the set of $\log_2(N)$ bits within the vector of bits b corresponds to a PMI, a set of PMIs or a phase difference value ($\varphi_k$) dependent on K.

In still a yet further embodiment, the PMI offset is applied as a power offset in a PDSCH transmission, where PDSCH precoding is applied according to a reported elevation PMI. The method 300 ends in a step 335.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A method of operating a communications system having a cellular structure, comprising:
    selecting a set of elevation precoding matrix indicator (PMI) offsets in an elevation codebook for elevation beamforming based on reducing inter-cell interference for neighboring cells by a base station located within a cell of the cellular structure;
    transmitting the set of elevation PMI offsets and a set of reference signals for channel quality and inter-cell interference measurements from the base station to user equipment within the cell;
    selecting a channel quality indicator (CQI) and a corresponding one of the set of elevation PMI offsets based on the channel quality and inter-cell interference measurements by the user equipment;
    reporting the selected CQI and elevation PMI offset by the user equipment to the base station; and
    transmitting data using an elevation beamforming based on the selected elevation PMI offset at a data rate based on the selected CQI from the base station to the user equipment;
    wherein the CQI is based on a ratio of a physical downlink shared channel (PDSCH) energy per resource element (EPRE) and at least one of the reference signals including a cell-specific reference signal (CRS) or a channel state information reference signal (CSI-RS) EPRE.

2. The method as recited in claim 1 wherein the at least one reference signal is based on a Radio Resource Control parameter nominal Physical Downlink Shared Channel-to-Reference Signal-Energy Per Resource Element-Offset for a CRS channel measurement or a parameter (p-C) representing a (CSI-RS channel measurement.

3. The method as recited in claim 1 wherein the PMI offset corresponds to a common offset applied to all PMI values in the elevation codebook.

4. The method as recited in claim 1 wherein the PMI offset corresponds to an offset separately applied to each PMI in order to enable biasing of a resulting channel quality indicator in a direction-dependent beamforming manner.

5. The method as recited in claim 1 wherein the PMI offset is one of N possible values and can be signaled using $\log_2(N)$ bits.

6. The method as recited in claim 1 wherein the elevation codebook contains K distinct rank-1 precoders that include discrete Fourier transform (DFT) precoders having a K equal to 16.

7. The method as recited in claim 1 wherein the elevation codebook contains precoding matrices with columns of a form $w=[w_1, w_2, \ldots, w_M]^T$, where M is a number of transmit antenna ports and a phase difference of weights corresponding to two specific antenna ports p and q employs K different phase values, wherein the elevation codebook contains K distinct rank-1 precoders.

8. The method as recited in claim 1 wherein the PMI offset is one of N possible values and is signaled as a length $K*\log_2(N)$ vector of bits b, where each set of $\log_2(N)$ bits corresponds to a the PMI offset value and a location of the set of $\log_2(N)$ bits within the vector of bits b corresponds to a precoding matrix indicator, a set of precoding matrix indicators or a phase difference value dependent on K, wherein the elevation codebook contains K distinct rank-1 precoders.

9. The method as recited in claim 1 wherein the PMI offset is applied as a power offset in a PDSCH transmission, where PDSCH precoding is applied according to a reported elevation precoding matrix indicator.

10. A method of operating a communications system having a cellular structure, comprising:
  selecting a set of elevation precoding matrix indicator (PMI) offsets in an elevation codebook for elevation beamforming based on reducing inter-cell interference for neighboring cells by a base station located within a cell of the cellular structure;
  transmitting the set of elevation PMI offsets and a set of reference signals for channel quality and inter-cell interference measurements from the base station to user equipment within the cell;
  selecting a channel quality indicator (CQI) and a corresponding one of the set of elevation PMI offsets based on the channel quality and inter-cell interference measurements by the user equipment;
  reporting the selected CQI and elevation PMI offset by the user equipment to the base station; and
  transmitting data using an elevation beamforming based on the selected elevation PMI offset at a data rate based on the selected CQI from the base station to the user equipment;
  wherein the PMI offset is one of N possible values and is signaled as a length $K*\log 2(N)$ vector of bits b, where each set of $\log 2(N)$ bits corresponds to a PMI offset value and a location of the set of $\log 2(N)$ bits within the vector of bits b corresponds to a precoding matrix indicator, a set of precoding matrix indicators or a phase difference value dependent on K, wherein the elevation codebook contains K distinct rank-1 precoders.

11. The method as recited in claim 10 wherein the CQI is based on a ratio of a physical downlink shared channel energy per resource element (EPRE) and at least one of the reference signals including a cell-specific reference signal (CRS) or a channel state information reference signal (CSI-RS) EPRE.

12. The method as recited in claim 11 wherein the at least one reference signal is based on a Radio Resource Control parameter nominal Physical Downlink Shared Channel-to-Reference Signal-Energy Per Resource Element-Offset for a CRS channel measurement or a parameter (p-C) representing a CSI-RS channel measurement.

13. The method as recited in claim 10 wherein the PMI offset corresponds to a common offset applied to all PMI values in the elevation codebook.

14. The method as recited in claim 10 wherein the PMI offset corresponds to an offset separately applied to each PMI in order to enable biasing of a resulting channel quality indicator in a direction-dependent beamforming manner.

15. The method as recited in claim 10 wherein the PMI offset is one of N possible values and can be signaled using $\log_2(N)$ bits.

16. The method as recited in claim 10 wherein the elevation codebook contains K distinct rank-1 precoders that include discrete Fourier transform (DFT) precoders having a K equal to 16.

17. The method as recited in claim 10 wherein the elevation codebook contains precoding matrices with columns of a form $w=[w_1, w_2, \ldots w_M]^T$, where M is a number of transmit antenna ports and a phase difference of weights corresponding to two specific antenna ports p and q employs K different phase values, wherein the elevation codebook contains K distinct rank-1 precoders.

18. The method as recited in claim 10 wherein the PMI offset is applied as a power offset in a Physical Downlink Shared Channel (PDSCH) transmission, where PDSCH precoding is applied according to a reported elevation precoding matrix indicator.

19. A method of operating a communications system having a cellular structure, comprising:
  selecting a set of elevation precoding matrix indicator (PMI) offsets in an elevation codebook for elevation beamforming based on reducing inter-cell interference for neighboring cells by a base station located within a cell of the cellular structure;
  transmitting the set of elevation PMI offsets and a set of reference signals for channel quality and inter-cell interference measurements from the base station to user equipment within the cell;
  selecting a channel quality indicator (CQI) and a corresponding one of the set of elevation PMI offsets based on the channel quality and inter-cell interference measurements by the user equipment;
  reporting the selected CQI and elevation PMI offset by the user equipment to the base station; and
  transmitting data using an elevation beamforming based on the selected elevation PMI offset at a data rate based on the selected CQI from the base station to the user equipment;
  wherein the PMI offset is applied as a power offset in a Physical Downlink Shared Channel (PDSCH) transmission, where PDSCH precoding is applied according to a reported elevation precoding matrix indicator.

20. The method as recited in claim 19 wherein the CQI is based on a ratio of a PDSCH energy per resource element (EPRE) and at least one of the reference signals including a cell-specific reference signal (CRS) or a channel state information reference signal (CSI-RS) EPRE.

21. The method as recited in claim 20 wherein the at least one reference signal are based on a Radio Resource Control parameter nominal Physical Downlink Shared Channel-to-Reference Signal-Energy Per Resource Element-Offset for a cell-specific reference signal (CRS) channel measurement or a parameter (p-C) representing a channel state information reference signal (CSI-RS) channel measurement.

22. The method as recited in claim 19 wherein the PMI offset corresponds to a common offset applied to all PMI values in the elevation codebook.

23. The method as recited in claim 19 wherein the precoding matrix indicator offset corresponds to a precoding matrix indicator offset separately applied to each precoding matrix indicator in order to enable biasing of a resulting channel quality indicator in a direction-dependent beamforming manner.

24. The method as recited in claim 19 wherein the PMI offset is one of N possible values and can be signaled using $\log_2(N)$ bits.

25. The method as recited in claim 19 wherein the elevation codebook contains K distinct rank-1 precoders that include discrete Fourier transform (DFT) precoders having a K equal to 16.

26. The method as recited in claim 19 wherein the elevation codebook contains precoding matrices with columns of a form $w=[w_1, w_2, \ldots, w_M]^T$, where M is a number of transmit antenna ports and a phase difference of weights corresponding to two specific antenna ports p and q employs K different phase values, wherein the elevation codebook contains K distinct rank-1 precoders.

27. The method as recited in claim 19 wherein the PMI offset is one of N possible values and is signaled as a length $K*\log_2(N)$ vector of bits b, where each set of $\log_2(N)$ bits corresponds to a PMI offset value and a location of the set of $\log_2(N)$ bits within the vector of bits b corresponds to a precoding matrix indicator, a set of precoding matrix indicators or a phase difference value dependent on K, wherein the elevation codebook contains K distinct rank-1 precoders.

* * * * *